June 17, 1930. A. FERRETTI ET AL 1,764,293
PARACHUTE
Filed Aug. 21, 1929   3 Sheets-Sheet 1
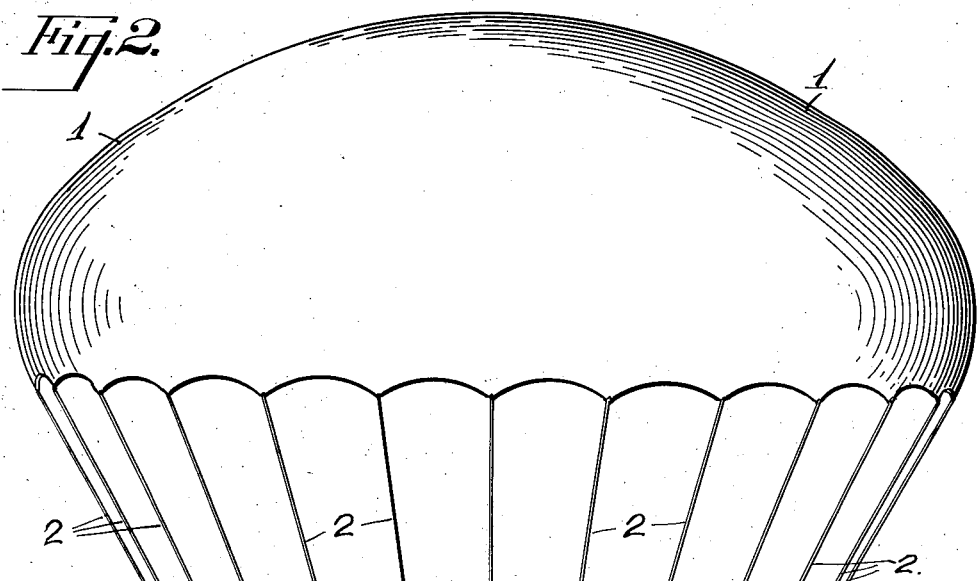
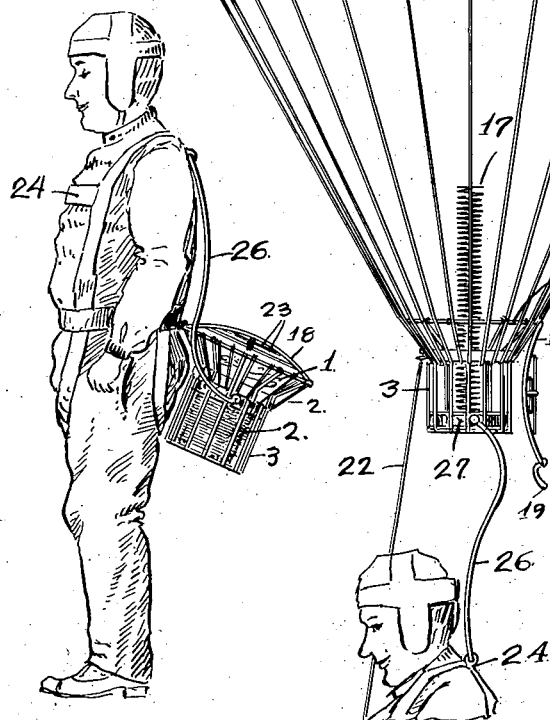
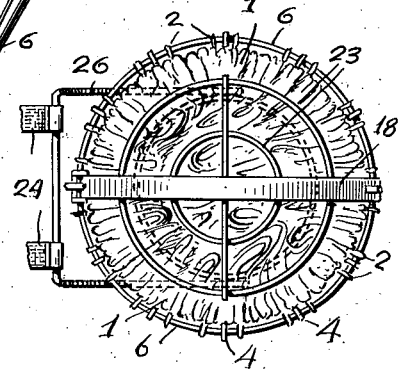
INVENTORS
ANTONIO FERRETTI
ATTILIO CORDA
BY
ATTORNEY.

June 17, 1930.   A. FERRETTI ET AL   1,764,293
PARACHUTE
Filed Aug. 21, 1929   3 Sheets-Sheet 2
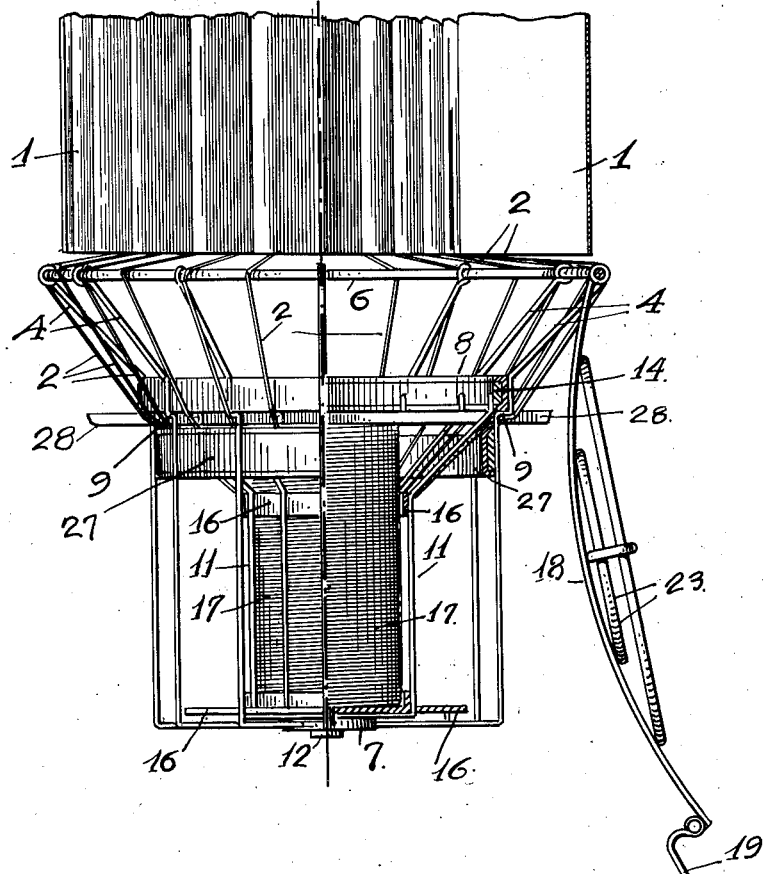
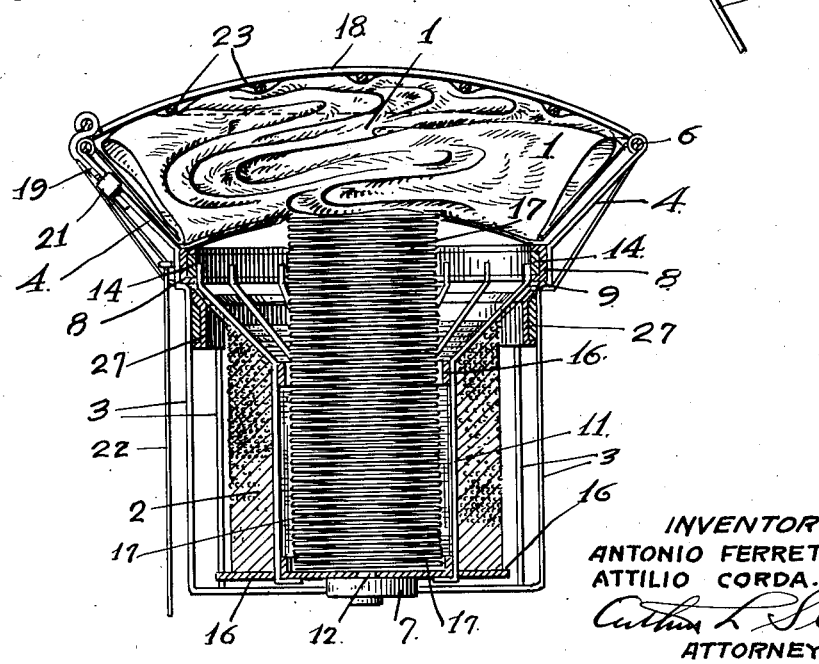
INVENTORS.
ANTONIO FERRETTI.
ATTILIO CORDA.
ATTORNEY.

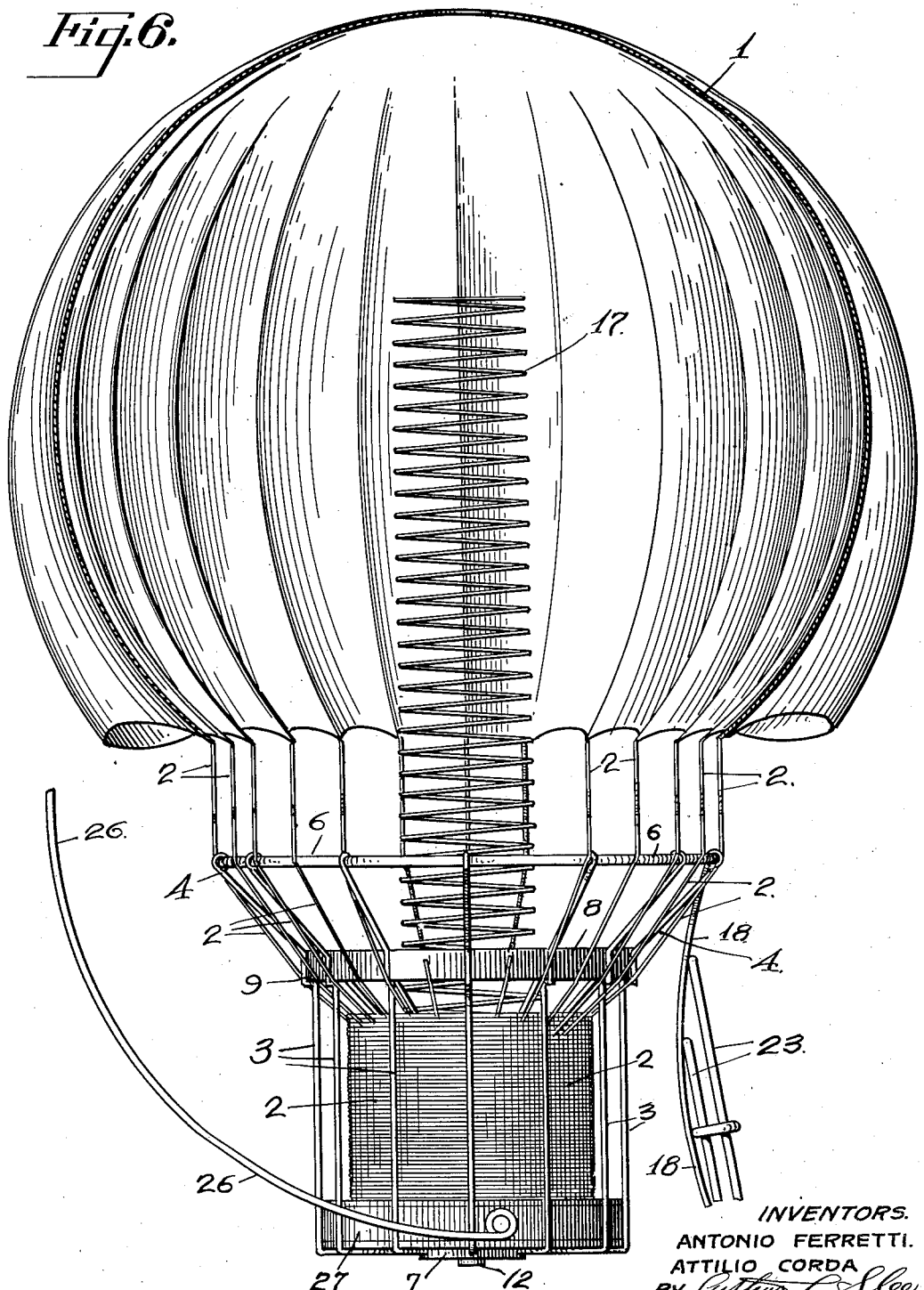

Patented June 17, 1930

1,764,293

UNITED STATES PATENT OFFICE

ANTONIO FERRETTI AND ATTILIO CORDA, OF SAN FRANCISCO, CALIFORNIA

PARACHUTE

Application filed August 21, 1929. Serial No. 387,412.

Our invention relates to improvements in parachutes for aviators wherein a parachute is normally retained in folded position within a cage provided with a rotatable drum for winding and dispensing the cords of the parachute and having means for positively expelling the parachute from the cage when a descent is to be made.

The primary object of our invention is to provide an improved parachute for individual use by aviators.

Another object is to provide an improved device of the character described which will effectively expel the parachute when a descent is to be made.

A further object is to provide an improved device provided with means for winding and dispensing the cords of a parachute to effectually guard against tangling of the cords and to insure a quick and efficient opening of the parachute.

Another object is to provide an improved device of the character described in which the parachute and cords are efficiently retained in normal position and in which the retaining means may be quickly and positively moved to release the parachute and cords when a descent is made.

A further object is to provide an improved device of light but rugged construction which is highly efficient and which may be effectively fastened to an aviator to occasion a minimum of inconvenience and discomfort and which will support the aviator in a natural position when a descent is made.

We accomplish these and other objects by means of the improved device disclosed in the drawings forming a part of the present application wherein like characters of reference are used to designate similar parts throughout the specification and drawings, and in which—

Fig. 1 is a view showing the manner in which our improved parachute is attached to a harness and carried upon the back of an aviator;

Fig. 2 is a view showing the manner in which an aviator is suspended from the parachute when a descent is being made;

Fig. 3 is a plan view of the parachute as normally retained within the parachute cage;

Fig. 4 is a broken side elevation, partly in vertical section, illustrating the manner in which the parachute is packed within its cage, the coiled cords being omitted from the drum;

Fig. 5 is a vertical section of the device showing the parachute in folded position ready for use; and Fig. 6 is a side elevation, partly in section, showing the manner in which the parachute is expelled and distended when released to make a descent.

Referring to the drawings, the numeral 1 is used to designate in general a parachute having the usual cords 2 connected to the edges thereof in the usual manner. In our present invention, the parachute is arranged to be normally folded in inoperative position within the top of a cage or container designated in general by the numeral 3.

The cage 3 consists of a plurality of wire members shaped to form a basket like container having a closed bottom and provided with an outwardly flaring open top portion 4, having an annular ring 6 defining the upper edge of said flaring top portion and anchoring the ends of the wire members in regularly spaced relation. A bearing member 7 is secured within the closed bottom of the cage 3, and an annular bearing ring 8 is secured within offset shoulders 9 formed in the wire members adjacent the flaring portion 4.

A drum or reel 11 is rotatably mounted within the cage 3, said drum being arranged coaxial with the cage 3 and having a shaft 12 journalled in the bearing member 7. An annular ring 14 defines the outer end of the drum 11 and is rotatably engaged by the bearing ring 8. The drum is preferably formed from a plurality of spaced wire members secured at their lower ends to an annular flange member 16, the upper ends of said members being shaped to incline outwardly and upwardly into engagement with the ring 14 to define the upper end of the drum. The drum is reinforced and strengthened by a ring 16 secured within the wire members adjacent the point at which said wire members are bent outwardly toward the ring 14.

A suitable coil spring 17 is mounted axially within the drum 11 and cage 3. The spring 17 is arranged to be compressed normally within the drum and to expand and extend axially outwardly from the top of the drum and cage when a normal retaining pressure is released.

A retaining member 18 is pivotally mounted upon the upper edge of the cage 3. The retaining member comprising an arched bar, preferably pivoted directly upon the ring 6 and provided with a pivoted extension 19 movable to extend over the ring 6 at a point diametrically opposite the pivot point. A catch 21 is mounted upon the flaring portion 4 adjacent the extension 19 to releasably engage the same whereby the retaining member may be releasably secured in retaining position across the top of the cage. The catch member 21 is preferably slidably mounted upon the flaring portions of the wire members 4 forming the cage and is arranged to be actuated by a suitable pull cord 22 extended to any convenient position about the person of an aviator whereby the catch may be moved to release the extension 19 by simply exerting a pull upon the cord 22. Annular cover rings 23 are secured upon the bar 18 and are arranged to be moved by said bar to distribute a retaining pressure over the upper exposed surface of the parachute when folded into the top of the cage 3.

The cage 3 is arranged to be secured to a suitable harness 24 worn by an aviator by means of a yoke 26 pivotally connected at one end to the harness, preferably at points across the shoulders of the aviator. The ends of the yoke arm members are pivotally mounted at diametrically opposite points upon a ring 27 slidably mounted within the cage 3. The ring 27 is guided by the sides of the cage and is slidably movable outside of the drum and the cords 2 wound thereon. The movement of the ring 27 is limited at the top of the bearing ring 8 and at the bottom by the bottom of the cage 3.

In packing the parachute into the cage 3, the spring 17 is initially compressed into the drum 11 and held in compressed position by inserting a rod 28 through the cage and drum below the bearing ring 8, as shown in Fig. 4 of the drawings. The parachute 1 is folded to form plaits, the folds of which extend outwardly from the points of attachment of the cords 2 and substantially match with the spaces between the wire cage members spaced around the flaring portion 4 of the cage. The cords 2 are connected to the parachute in the ordinary manner and at their opposite ends to the drum 11 in any suitable manner.

The cords 2 are extended over the outside of the ring 6 and enter the cage 3 at points below the bearing ring 8, and are wound in parallel relation upon the drum 11 by rotating the drum 11 in any suitable manner to lay the cords in regular laps upon the drum. As the cords 2 are taken up onto the drum, the edge of the parachute is drawn to the edge of the cage 3 as best shown in Fig. 4 of the drawings. The parachute 1 is then folded into the upper flaring portion 4 of the cage, the open ends of the plaits being disposed around the edge of the flaring portion 4 so as to readily admit air into said plaits. The body of the parachute is then folded and packed into the top of the flaring portion 4 above the drum 11. The retaining member 18 is then moved to extend across the top of the cage, as shown in Fig. 5 of the drawings, the rings 23 being pressed onto the top of the folded parachute to effectively retain the same. The catch member 21 is then moved to engage the extension 19 of the member 18 to releasably retain the member in retaining position. When the parachute has been thus packed, the rod 28 is withdrawn, thereby permitting the spring 17 to expand against the folded parachute 1 and retaining member 18.

As the drum is rotated to wind the cords 2 thereon, the ring 27 is permitted to occupy a position at the bottom of the cage 3 to avoid interference with the winding of the cords. When the cage is supported by the yoke 26 upon the back of an aviator, the weight of the cage and parachute causes the cage to move downwardly relative to the ring 27, thereby causing said ring to engage and hold the cords 2 against the under side of the bearing ring 8 and in this manner preventing the cords from becoming unwound from the drum.

In operation, the parachute is normally carried upon the back of an aviator as shown in Fig. 1, the relatively long yoke 26 permitting the parachute to be moved away from the body of the aviator when seated to afford comfort to the wearer. In case a descent by parachute becomes necessary, the aviator, after jumping from his machine, pulls the cord 22 and thereby releases the retaining member 18. As soon as the member 18 is released, the spring 17, which is normally held compressed below the parachute, expands and expels the parachute from the flaring end of the cage 3. As the parachute is expelled, air enters the open ends of the plaits and the parachute will be quickly distended by the air. The first air entering the plaits of the parachute causes the movement of the parachute to be slightly retarded, this action causing the cage to be similarly retarded so that the yoke will be swung to a position above the head of the aviator, and with the arms of the yoke disposed upon opposite sides of the aviator's head and suspending the aviator in a natural position from the fastenings at the back of his shoulders. This relative movement of the cage causes the ring 23 to be moved to the bottom of the cage 3, thereby releasing the cords 2 and permitting said cords to be dispensed from the drum 11 as the parachute is distended.

The spring 17 operates with a positive pressure to expel the parachute from its cage, and the free dispensing of the cords 2 from the drum insures that the cords will be kept straight and untangled and thus guards against possible failure of the parachute to open due to tangling or binding of the cords 2.

While we have illustrated and described only one specific embodiment of our invention, the details of construction and arrangement are subject to modification in various ways without departing from the spirit of our invention. We therefore desire to avail ourselves of such modifications as may fall within the scope of the appended claims.

Having thus described our invention, what we claim as new and desire to secure by Letters Patent is:—

1. A parachute comprising a cage; a drum rotatable within the cage; a parachute adapted to be folded into the top of the cage; a plurality of cords each connected at one end to the parachute and at the opposite end to the drum, said cords being adapted to be wound upon the drum; releasable means mounted across the top of the cage to normally retain the parachute therein; and expandible means mounted within the drum to expel the parachute from the cage when the releasable means is released.

2. A parachute comprising a cage; a drum rotatable within the cage; a parachute adapted to be folded into the top of the cage; a plurality of cords each connected at one end to the parachute and at the opposite end to the drum, said cords being adapted to be wound upon the drum; releasable means mounted across the top of the cage to normally retain the parachute therein; expandible means mounted within the drum to expel the parachute from the cage when the releasable means is released; and means pivoted upon the cage and adapted to be connected to a harness fastened upon a wearer to suspend the wearer below the cage when a descent is made.

3. A parachute comprising a cage; a drum rotatable within the cage; a parachute adapted to be folded into the top of the cage; a plurality of cords each connected at one end to the parachute and at the opposite end to the cage, said cords being adapted to be wound onto the drum and to be unwound when the parachute is extended; releasable means mounted across the top of the cage to normally retain the parachute in folded position within the cage; and a spring normally compressed within the drum and adapted to expand axially outward to expel the parachute from the cage when the releasable means is released.

4. A parachute comprising a cage; a drum rotatable within the cage; a parachute adapted to be folded into the top of the cage; a plurality of cords each connected at one end to the parachute and at the opposite end to the drum, said cords being adapted to be wound onto the drum and to be unwound when the parachute is extended; a retaining member pivoted upon one side of the cage and movable to extend across the top of the cage to normally retain the parachute in folded position therein; a catch releasably securing the retaining member in retaining position; and a spring normally compressed within the drum and extendible outwardly therefrom to expel the parachute when the catch is released.

5. A parachute comprising a cage; a drum rotatable within the cage; a parachute adapted to be folded into the top of the cage; a plurality of cords each connected at one end to the parachute and at the opposite end to the drum, said cords being adapted to be wound onto the drum and to be unwound when the parachute is extended; a retaining member pivoted upon one side of the cage and movable to extend across the top of the cage to normally retain the parachute in folded position therein; a catch releasably securing the retaining member in retaining position; a spring normally compressed within the drum and extendible outwardly therefrom to expel the parachute when the catch is released; and a yoke pivotally connected to the cage and adapted to be connected to a harness fastened upon a wearer to suspend the wearer below the cage and parachute when a descent is made.

6. A parachute comprising a cage open at one end thereof and having an outwardly flaring portion at its open end; a drum axially disposed within the cage and rotatable herein; a parachute adapted to be folded into the flaring end portion of the cage; a plurality of flexible cords connecting the parachute to the cage and adapted to be wound onto the drum and unwound therefrom when the parachute is extended; a retaining member pivoted at one end thereof upon the cage and movable to extend across the cage to normally retain the parachute in folded position therein; a catch mounted upon the cage to releasably engage and retain the member in retaining position; and a spring axially disposed within the drum and normally held compressed within the drum and exerting an outward pressure against the parachute and retaining member to expel the parachute from the cage when the catch is released.

7. A parachute comprising a cage open at one end thereof and having an outwardly flaring portion at its open end; a drum axially disposed within the cage and rotatable therein; a parachute adapted to be folded into the flaring end portion of the cage; a plurality of flexible cords connecting the parachute to the cage and adapted to be wound onto the drum and unwound therefrom when the parachute is extended; a retaining member pivoted at one end thereof upon the cage and movable to extend across the cage to normally retain the parachute in folded position therein; a catch mounted upon the cage to releasably engage and retain the member in retaining position; a spring axially disposed within the drum and normally held compressed within the drum and exerting an outward pressure against the parachute and retaining member to expel the parachute from the cage when the catch is released; a yoke pivotally connected to the cage and adapted to be connected to a harness fastened to a wearer to suspend the wearer below the cage and parachute when a descent is made.

8. A parachute comprising a cage open at one end thereof and having an outwardly flaring portion at its open end; a drum axially disposed within the cage and rotatable therein; a parachute adapted to be folded into the flaring end portion of the cage; a plurality of flexible cords connecting the parachute to the cage and adapted to be wound onto the drum and unwound therefrom when the parachute is extended; a retaining member pivoted at one end thereof upon the cage and movable to extend across the cage to normally retain the parachute in folded position therein; a catch mounted upon the cage to releasably engage and retain the member in retaining position; a spring axially disposed within the drum and normally held compressed within the drum and exerting an outward pressure against the parachute and retaining member to expel the parachute from the cage when the catch is released; a yoke pivotally connected to the cage and adapted to be connected to a harness fastened to a wearer to suspend the wearer below the cage and parachute when a descent is made; and means connected to the catch and extending to a conveniently accessible position about the person of the wearer for moving said catch to release the retaining member.

9. A parachute comprising a wire cage closed at the bottom and having a flaring rim portion formed at the top thereof; a bearing member mounted within the bottom of the cage; a bearing ring mounted upon the cage adjacent the flaring rim; a drum mounted within the cage and rotatably engaged by the bearing member and bearing ring; a parachute adapted to be folded into the flaring end portion of the cage; a plurality of flexible cords connected to the parachute and adapted to be wound onto the drum and unwound therefrom when the parachute is extended; a retaining member pivoted at one end upon the cage and movable to extend across the flaring rim of the cage to normally retain the parachute in folded position therein; a catch mounted upon the cage to releasably engage and retain the member in retaining position; and a spring axially disposed within the drum and arranged to expand outwardly therefrom, said spring being normally compressed within the drum to exert an outward pressure against the folded parachute and the retaining member to expel the parachute from the cage when the catch is released.

10. A parachute comprising a wire cage closed at the bottom and having a flaring rim portion formed at the top thereof; a bearing member mounted within the bottom of the cage; a bearing ring mounted upon the cage adjacent the flaring rim; a drum mounted within the cage and rotatably engaged by the bearing member and bearing ring; a parachute adapted to be folded into the flaring end portion of the cage; a plurality of flexible cords connected to the parachute and adapted to be wound onto the drum and unwound therefrom when the parachute is extended; a retaining member pivoted at one end upon the cage and movable to extend across the flaring rim of the cage to normally retain the parachute in folded position therein; a catch mounted upon the cage to releasably engage and retain the member in retaining position; a spring axially disposed within the drum and arranged to expand outwardly therefrom, said spring being normally compressed within the drum to exert an outward pressure against the folded parachute and the retaining member to expel the parachute from the cage when the catch is released; and a ring slidably mounted within the cage and movable to clamp the cords against the bearing ring to normally prevent unwinding of said cords from the drum.

11. A parachute comprising a wire cage closed at the bottom and having a flaring rim portion formed at the top thereof; a bearing member mounted within the bottom of the cage; a bearing ring mounted upon the cage adjacent the flaring rim; a drum mounted within the cage and rotatably engaged by the bearing member and bearing ring; a parachute adapted to be folded into the flaring end portion of the cage; a plurality of flexible cords connected to the parachute and adapted to be wound onto the drum and unwound therefrom when the parachute is extended; a retaining member pivoted at one end upon the cage and movable to extend across the flaring rim of the cage to normally retain the parachute in folded position therein; a catch mounted upon the cage to releasably engage and retain the member in retaining position; a spring axially disposed within the drum and arranged to expand outwardly therefrom, said spring being normally compressed within the drum to exert an outward pressure against the folded parachute and the retaining member to expel the parachute from the cage when the catch is released; a ring slidably mounted within the cage and movable to clamp the cords against the bearing ring to normally prevent unwinding of said cords from the drum; and a yoke pivoted upon said ring and adapted to be connected to a harness fastened to a wearer, said ring being moved to release the cords and to suspend the wearer below the cage when a descent is made.

12. The combination with a parachute, of a wire cage adapted to receive the parachute in folded position; a drum rotatably mounted within the cage to receive cords wound thereon and connected to the parachute, said cords being adapted to be unwound from the drum when the parachute is extended; and a spring normally compressed within the drum and extendible outwardly therefrom to expel the folded parachute from the cage.

13. The combination with a parachute, of a wire cage adapted to receive the parachute in folded position; a drum rotatably mounted within the cage to receive cords wound thereon and connected to the parachute, said cords being adapted to be unwound from the drum when the parachute is extended; a spring normally compressed within the drum and extendible outwardly therefrom to expel the folded parachute from the cage; and a ring slidably mounted within the cage and movable to normally prevent unwinding of the cords.

14. The combination with a parachute, of a wire cage adapted to receive the parachute in folded position; a drum rotatably mounted within the cage to receive cords wound thereon and connected to the parachute, said cords being adapted to be unwound from the drum when the parachute is extended; a spring normally compressed within the drum and extendible outwardly therefrom to expel the folded parachute from the cage; a ring slidably mounted within the cage and movable to normally prevent unwinding of the cords; and means connecting said ring to a harness fastened to a wearer whereby the weight of said wearer will move the ring to release the cords when a descent is made.

15. A container for parachutes comprising a wire cage closed at the bottom and having an open flaring portion formed at the top thereof; a bearing member mounted within the closed end of the cage; a bearing ring mounted adjacent the flaring portion; a reinforcing and cord spreading ring mounted within the outer edge of the flaring portion; a drum mounted within the cage and provided with a shaft engaging the bearing member and also provided with a ring rotatably mounted within the bearing ring, said drum being rotatable within the cage to wind and unwind the cords of a parachute; and a cover pivotally mounted upon the cage and movable to extend across the top of the cage to normally retain a parachute folded within the flaring top portion of the cage, and being movable to release the parachute when a descent is made.

16. A container for parachutes comprising a wire cage closed at the bottom and having an open flaring portion formed at the top thereof; a bearing member mounted within the closed end of the cage; a bearing ring mounted adjacent the flaring portion; a reinforcing and cord spreading ring mounted within the outer edge of the flaring portion; a drum mounted within the cage and provided with a shaft engaging the bearing member and also provided with a ring rotatably mounted within the bearing ring, said drum being rotatable within the cage to wind and unwind the cords of a parachute; a cover pivotally mounted upon the cage and movable to extend across the top of the cage to normally retain a parachute folded within the flaring top portion of the cage, and being movable to release the parachute when a descent is made; and a spring compressed axially within the drum and expandible to expel the parachute from the cage when the cover is released.

In witness whereof, we hereunto set our signatures.

ANTONIO FERRETTI.
ATTILIO CORDA.